United States Patent [19]
Sumida

[11] 3,808,682
[45] May 7, 1974

[54] PNEUMATICALLY DRIVEN SHEAR

[75] Inventor: Kunio A. Sumida, Los Angeles, Calif.

[73] Assignee: Leonard V. Shapiro, St. Paul, Minn.

[22] Filed: Jan. 10, 1972

[21] Appl. No.: 216,387

[52] U.S. Cl. .................................................. 30/228
[51] Int. Cl. ............................................. B26b 15/00
[58] Field of Search ............. 29/106; 30/123.3, 219, 30/222, 224, 228, 229, 247, 258, 267, 215, 216, 217, 218, 220; 83/169

[56] References Cited
UNITED STATES PATENTS

| | | | |
|---|---|---|---|
| 2,934,822 | 5/1960 | Docken | 30/228 X |
| 3,362,071 | 1/1968 | Schmidt | 30/258 |
| 2,007,355 | 6/1935 | Wallace | 30/144 |
| 3,025,599 | 3/1962 | Savers | 30/228 |
| 879,900 | 2/1908 | Potstada | 30/258 |

Primary Examiner—Othell M. Simpson
Assistant Examiner—Mark S. Bicks
Attorney, Agent, or Firm—Smyth, Roston & Pavitt

[57] ABSTRACT

A three-bladed pneumatically driven shear in which the central, moving blade is provided with a transverse and longitudinal curved surface on its lower edge to reduce frictional contact between the blade and the material to be severed and to allow the cutter to make relatively small radius cuts in the material being severed. The transverse curvature on the bottom of the blade prevents it from biting into the material and inhibiting the turning of the cutter along a radius on the material being severed. The side, fixed blades are beveled on the lower surfaces in order to allow the operator to rotate the cutter about a vertical axis passing through the point of sharing without damaging the workpiece or the cutters while shearing along a curve. One of the side blades is positioned on the cutter so as to extend slightly below the bottom of the other side blade, thereby causing the center blade to commence cutting at one side of the cutter before the other. This facilitates the removal of the chip formed by the severed material by forcing it to curl off to one side away from the cutter. The central blade is formed so as to extend beyond the ends of the side blades in order to facilitate initial engagement with the material to be severed.

18 Claims, 4 Drawing Figures

PNEUMATICALLY DRIVEN SHEAR

BACKGROUND OF THE INVENTION

The present invention relates to the art of cutting sheet metals of the type normally used, for example, in automobile bodies, air-conditioning ducts, etc.

In the past, most such devices comprised a housing which could be temporarily attached to a portable motor, such as an electric drill, etc. A rotating cam element would be attached to the electric motor to cause reciprocation of one or more cam followers formed integral with the center blade of a three-bladed shear. As the cam followers are actuated by the rotating cam, the center blade is caused to oscillate about a pivot, causing it to move toward and away from a pair of side blades which are fixed in the housing. The resultant action is similar to that of a scissors, except that the moving blade acts together with both of the side blades so that two cutting edges cooperate simultaneously. In other words, shearing causes a thin strip of material, approximately equal to the width of the moving blade, to be removed from the workpiece.

In the commonly available prior art devices, a housing is provided in which the two fixed, side blades are mounted and supported throughout a major portion of the length thereof. In fact, the sides of the housing are normally extended nearly to the leading edges of the side blades so as to provide lateral support therefor. The oscillating blade is mounted intermediate the side blades in such a way that its upper surface forms a pair of cutting edges at the opposite sides thereof which cooperate with mating cutting edges on the bottoms of the side blades. The bottom of the housing, which is formed so as to be substantially coplanar with the side blades, is provided with a relatively broad surface which is positioned by the operator on the surface of the workpiece in order to support the cutter. In other words, the prior art devices provide a board, flat surface which rests upon the workpiece.

The center or oscillating blade extends below the support surface and is actuated in such a way as to form progressive parallel cuts in the workpiece as it is oscillated against the cutting edges of the fixed blades. The oscillating blade is normally provided with a straight configuration, as viewed from the front toward the rear of the cutter, and the sides thereof may be beveled slightly under the cutting edges in order to increase the clearance between the blade and the workpiece. The sides of the oscillating blade terminate at a relatively narrow, flat bottom edge of the blade, and the forward end of the blade may extend very slightly beyond the leading ends of the fixed blades.

The prior art cutters have been found to be unsatisfactory for a variety of reasons. For example, the broad, flat support surface formed by the housing and the fixed blades prevent the cutter from being used to cut a workpiece closely adjacent an edge thereof which is provided with a right angled lip or surface, since it is impossible to get the cutter very close to the lip. Further, a provision of the support surface prevents the operator from rotating the cutter slightly about its axis in order to cut the workpiece along a curve rather than merely along a straight line.

The ability to use the cutter to cut along a curve in the workpiece is further diminished by the oscillating blade. The formation of the blade with an exposed portion extending below the support surface along a substantially straight line creates a significant area of contact between the blade and the newly cut edges of the workpiece which prevent the cutter from being pivoted. Further, the flat surface on the bottom of the oscillating blade will tend to bite into the newly cut edges of the workpiece, not only making turning of the cutter impossible, but also making its control very difficult. In other words, when the operator attempts to pivot the cutter about a vertical axis which is at an acute angle relative to the axis of the cutter body and perpendicular to the plane of the workpiece, the entire shear body will attempt to reciprocate as the lower edge of the reciprocating blade bites into the workpiece. Pivoting will also be prevented by the contact, over a large area, of the sides of the reciprocating blade with the workpiece.

Consequently, when such cutters have been found to be useful at all, they are only useful for cutting along a straight line.

Even when cutting along such straight lines, however, such cutters are usually very difficult or impossible to use since the chip formed by the strip which is cut away from the workpiece by the cutter tends to curl up as a result of contact with the upper surface of the oscillating blade. As a result, when the severed chip curls back around into substantially a complete circle, it will severely impede the movement of the cutter across the workpiece; in many instances will make further progress of the cutter impossible until the chip is broken since the operator will be incapable of exerting sufficient force on the cutter to cause it to move against the reaction force generated by the curl.

In order to alleviate this problem and to cause the severed chip to curl off to one side of the cutter rather than directly on top of the cutter blades, attempts have been made to bevel the upper surface of the oscillating blade in order to cause it to enter into shearing contact with one of the fixed blades before it does so with the other. Unfortunately, when the bevel is formed at an angle which is sufficient to cause the severed chip to curl away from the cutter sufficiently to no longer impede forward motion, the cutting edge which is elevated as a result of the bevel becomes too sharp and soon wears away. At the same time, the depressed cutting edge quickly becomes very blunt and requires greater pushing force to be exerted by the operator and, relatively quickly, may fail to cut at all.

An additional disadvantage of the prior art devices results from the fact that the oscillating blade does not extend beyond the fixed blades sufficiently to allow the cutting edges to be any more than coextensive with the cutting edges of the fixed blades. As a result, it is often very difficult for the operator to capture the workpiece between the blades since only a relatively small opening is formed between the oscillating blade and the fixed blades when the blades are separated at a maximum angle.

Still further, it is relatively difficult to lubricate the prior art cutting devices without disassembling them since it is otherwise impossible to ensure that the lubricant will reach all of the locations at which friction can occur.

Thus it can be seen that although a need has long existed for a suitable hand-held three-bladed shear, as evidenced by the existence of the prior art devices, those shears available have been unsatisfactory in use as a result of the above-described deficiencies.

Summary of the Invention

The present invention relates to a hand-held three-bladed shear in which the disadvantages inherent in the prior art devices have been eliminated, allowing the shear to be far more flexible in its usage and more easily operated and controlled by the operator.

In one embodiment of the present invention, the shear comprises a housing in which is mounted a pneumatic motor which rotates a cam; the cam acts against a cam follower on the rear end of a center reciprocating blade to drive it toward a pair of fixed side blades. The center blade is provided with only one cam follower which serves to drive the blade toward the side blades. In other words, when the center blade is reciprocated into its ultimate position between the side blades, it is not reciprocated back to the extended position by any operation of the motor. Consequently, when the center blade is in its ultimate position, i.e., the blades are fully closed, there is no danger of injury to the operator, should he inadvertently put his hand near the leading edges of the cutter.

Also in the preferred embodiment, the center blade is produced so that its two cutting edges extend beyond the ends of the fixed blades. As a result, when the operator is ready to use the device, he can locate the extended leading end of the center blade beneath the edge of the workpiece and raise the cutter slightly. This will cause the center blade to pivot away from the fixed blades, creating an opening therebetween. If the operator then pushes on the cutter body, the workpiece will enter the opening between the blades under the guidance of the reciprocating blade and cutting can begin. It should be noted that this feature significantly improves the operation of such devices since the operator is no longer required to position the workpiece within a relatively small opening between a set of fast moving blades.

Lubrication of the blades of the present invention has been made relatively simple by the utilization of a well-known principle in a novel manner. For example, it has been well known to lubricate pneumatic motors by placing a small quantity of lubricant at the motor air inlet and then blowing the lubricant through the motor by the injection of air into it.

It has now been found that this method of lubrication can also be utilized to lubricate blades of the present invention by causing the motor air exhaust to be directed across the blades, thereby causing lubricant which is excess to the fluid motor to be deposited between the blades and lubricate the friction contact surfaces thereof.

As stated previously, one of the biggest problems with such prior art devices has been the fact that it is relatively impossible to cut the workpiece along a curve. In a preferred embodiment of the present invention, this has been obviated by providing the various blades with different clearances and radii as will be described so as to allow the cutter to be moved along substantially any desired curve delineated on the workpiece.

In the preferred embodiment, the fixed blades extend well beyond the motor housing and are fastened together and to the housing at a plurality of positions so that they support one another with substantially the same strength as if their external sides were bounded by the housing itself. The bottom surfaces of the fixed blades may be beveled at a suitable angle so that no broad area of contact between the cutter and the workpiece will occur. In addition to allowing the cutter to be rotated about its main axis, the elimination of the broad surface contact also causes a reduction in the friction between the cutter and the workpiece, thereby reducing the effort which must be exerted by the operator to drive the cutter across the workpiece.

Further, since the enlarged housing does not extend along the sides of the fixed blades, the cutter can be used to cut the workpiece very close to the perpendicular edge lip, the determination of the "closeness" dimension being limited only by the width of the fixed blade which must be positioned between the lip and the oscillating blade.

The lower edge of the center blade is provided with a radius extending from side-to-side which prevents the center blade from biting into the newly cut edge on the workpiece since no biting or secondary cutting edge is formed thereon. Further, the bottom of the oscillating blade may be formed so as to extend along an arc from the front of the blade toward the rear. As a result, the height of the blade, or distance between the upper to lower edges thereof, is diminished. Therefore, the only portion of the surface on the side of the oscillating blade which can possibly contact the newly cut edge of the workpiece at any given time is significantly reduced. Thus, by this means, the frictional contact of the cutter with the workpiece is further reduced and the operator's ability to pivot the cutter about a vertical axis passing through the point of cutting when shearing along a curve is additionally enhanced.

In order to provide for improved chip removal, a novel method for causing the chip to curl away from the cutter may be provided. It has now been found that the cutting edge on one of the side blades may be located at a slightly depressed elevation relative to the cutting edge on the other side blade. As a result, the depressed cutting edge contacts the cutting edge on the oscillating blade prior to such contact by the opposite blade at any given position along the length of the cutters.

In other words, considered at any cross sectional position of the workpiece, cutting will be initiated between the oscillating blade and one of the fixed blades before it occurs between the oscillating blade and the second fixed blade. Consequently, the chip being cut from the workpiece will curl away from the cutter blades and thus will not inhibit or prevent their forward movement across the workpiece. Further, by this means such curling may be accomplished without causing any of the cutting edges to become too sharp or too blunt, as is the case with the prior art devices.

Although the above summary of this invention describes a plurality of different features, it will be realized by those skilled in the art that those features can be utilized individually or in any given combination to aid in the production of desirable results. Further, additional advantages, objects, embodiments, and modes of this invention will become readily apparent to those skilled in the art upon review of the following Detailed Description, taken together with the accompanying drawings, which describe and illustrate only one preferred embodiment of the invention which is delineated by the appended claims.

DETAILED DESCRIPTION

Figure 1:
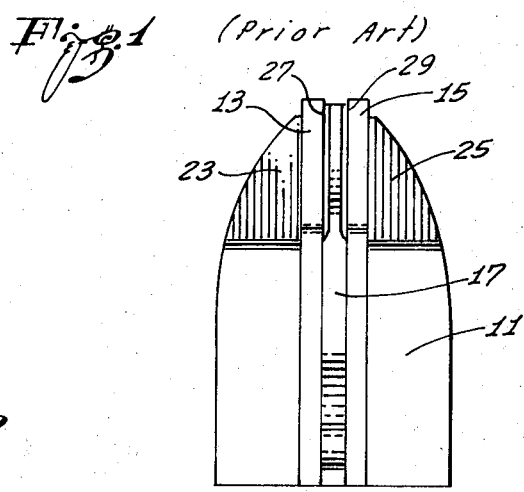
FIG. 1 comprises a bottom view of a prior art shear of a type with which the present invention is concerned.

As seen in FIG. 1, one prior art shear comprises a housing 11 having first and second fixed shear blades 13 and 15, respectively, between which is pivotally mounted an oscillatable blade 17.

As seen, the ends of the housing at 23 and 25 provide lateral support for the blades 13 and 15. Together with the bottom surfaces of the blades which are facing the viewer, the ends 23 and 25 also serve to create a broad, substantially flat surface which rests against the upper surface of a material to be cut. Although not shown in the drawing, the upper surface of the center blade 17 includes a pair of cutting edges extending along the sides thereof which cooperate with cutting edges 27 and 29 of the fixed blades to sever material which is to be cut. As will be apparent to those skilled in the art, the operation of the device will produce a thin strip or continuous chip of material which is cut away from the workpiece.

It will also be apparent to those familiar with the art that the broad flat surface formed by the housing and the blades will prevent the tool from being rotated even slightly about its axis which, in the present illustration, is substantially perpendicular to the plane of the drawing. Further, the lower surface of the blade 17, which can be seen in the figure, is also formed as a flat surface and thus has relatively sharp edges at either side thereof. Although the edges of the lower surface of the oscillatable blade are not meant to be used as cutting edges, when the tool operator attempts to turn the tool so as to follow a radius drawn upon the workpiece, the lower edges of the oscillatable cutter blade 17 will tend to bite into the newly severed edges of the workpiece. Thus, they will act as secondary cutting edges and chip and damage the workpiece.

As is also seen from the drawing, the center blade member 71 is normally provided to be of substantially the same length or only very slightly longer than the fixed blades 13 and 15. In either event, the cutting edges on the moving blade are normally formed so as to be substantially the same length as the cutting edges on the fixed blades. Further, the movable blade is normally provided so as to be pivotally mounted relative to the fixed blades in such a manner that the extreme ends of the cutting edges cooperate with one another with no cutting edge extending beyond the extermity of any other cutting edges. As a result, it is often quite difficult to locate the cutters relative to the workpiece since the stroke of the movable blade is relatively short in order to utilize a maximum amount of power as well as to cause the movable blade to pivot as rapidly as possible in order to increase cutting speed.

Since the exposed lower edge of the blade 17 is substantially flat throughout the area of its exposure below the lower surface of the fixed blades 13 and 15, a relatively great amount of the movable blade is able to come into contact with the edges of the newly cut workpiece and further inhibit the movement of the cutter along a curve.

Figure 2:
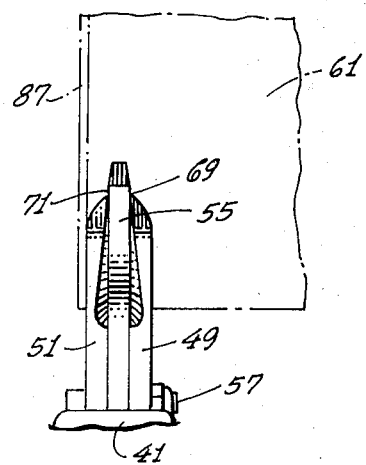
FIG. 2 comprises a partial top plan view of the shearing blades formed in accordance with the present invention.
Figure 4:
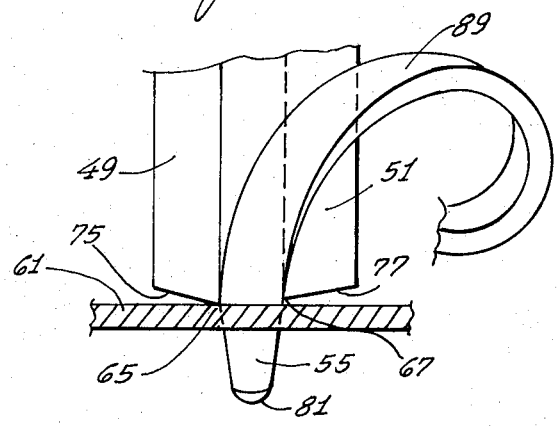
FIG. 4 comprises a front view of the shear blades as seen along a line IV—IV of FIG. 3.
Figure 3:
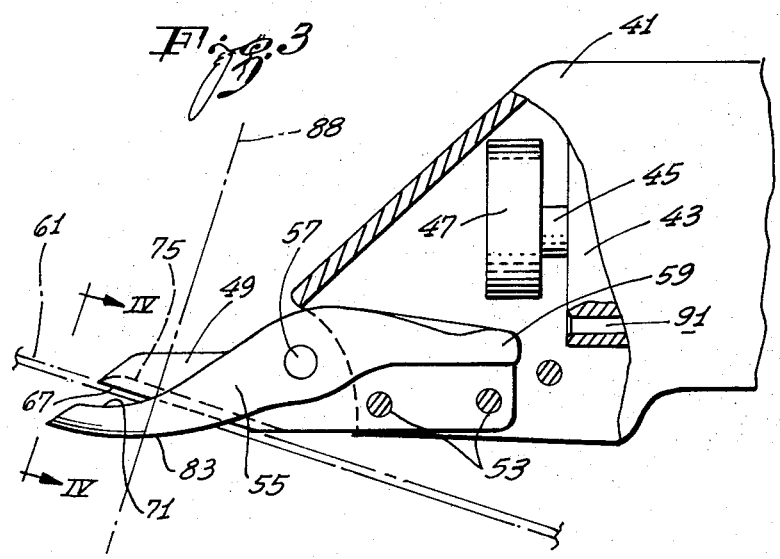
FIG. 3 is a side view of the present invention with portions thereof removed or shown in section to illustrate the operation of the shear.

Referring now to the improved embodiment of the present invention as disclosed in FIGS. 2–4, a housing 41 is shown as containing a drive motor 43 which may, if desired, be pneumatically driven. In any event, the shaft 45 of the motor may be utilized to rotate a cam member 47 eccentrically related to the axis of the shaft 45. A pair of side blades 49 and 51 (FIG. 2) may be suitably mounted on the housing 41 by any desired means, such as by bolts 53 which pass through the housing and the blades.

A center blade 55 may be pivotally attached, as at 57, to the side blades 49 or, alternatively, to the housing 41. The center blade is provided with a cam follower 59 at the rear end thereof which may be actuated about the pivot point 57 by the cam 47 as it is driven by the motor 43.

In other words, cam 47 will drive the blade 55 only in a counterclockwise direction about the pivot 57, as viewed in FIG. 3; i.e., the cam 47 drives the blade 55 only toward the closed position, relative to blades 49. Movement of the blade in the opposite direction of rotation will be generated by contact between the upper surface of the blade 55, i.e., starting at the outer tip thereof, and the uncut portion of the workpiece 61.

As seen in FIG. 4, the fixed blade 49 is provided with a cutting edge 65 and the fixed blade 51 is provided with a cutting edge 67. Referring to FIG. 2, it can be seen that the blade 55 is provided with cooperative cutting edges 69 and 71. Thus, as the blade 55 is oscillated about the pivot 57, the cutting edges 65 and 69 will sever the material along one line and the cutting edges 67 and 71 will sever it along a parallel line which is separated from the first cutting line by the width of blade 55, plus the width of the clearance required to allow the blades to pass in relative motion.

As is most clearly seen in FIG. 4, each of the side blades 49 and 51 may be provided with a beveled surface 75 and 77, respectively, so that, if desired, the tool operator can rotate the tool about its longitudinal axis to follow a curve along the workpiece. Further, the beveled surfaces on the lower edges of the side blades result in reduced friction between the blade and the workpiece, allowing the operator to push the tool across the workpiece with less effort and at a faster rate of speed.

Referring to FIGS. 3 and 4 together, the lower edge of the center blade 55 may be provided with a transverse curvature 81 (FIG. 4) and a longitudinal curvature 83 (FIG. 3) which provide the entire exposed lower surface of the movable center blade 55 with a smooth and rounded configuration. Thus, the center blade cannot bind upon the workpiece 61 when the operator attempts to turn the tool about a vertical pivot 87, while attempting to cut the workpiece along a curved line. Since the lower surface of the center blade is thus smoothly configured, it will not attempt to act as a secondary cutting surface and bite into the edges of the workpiece located behind the cutting point of the tool. Of course, it will be realized that at any given instant the exact location of the vertical axis 88 will be varied in accordance with the relative positions of the blades as the tool is being operated. However, regardless of the particular location of the axis 87, the middle, movable blade will not be able to severely obstruct movement or bite into the workpiece.

Additionally, as a result of the longitudinal curvature 83 of the blade 55, the width of the blade which is contacted by the workpiece is significantly reduced over the prior art devices. Consequently, frictional contact between the blade and the workpiece is further reduced and the operator's ability to turn the tool about a radius on the workpiece is increased.

A comparison of FIGS. 2 and 3 will clearly reveal that the cutting edges 69 and 71 may be extended forward of and beyond the ends of the cutting edges 65 and 67.

As a result, it will be a very simple matter for the tool operator to hold the tool in one hand, slide the leading edge of the blade underneath the workpiece, lift the tool to rotate the blade 55 to the open position illustrated in FIG. 3, and push the tool forward so that the workpiece is properly guided and positioned between the fixed blades and the movable blades. Thus, with ease with which the operator can start cutting with the tool is vastly enhanced since, as is apparent from the drawings, the opening between the fixed and movable blades is relatively small. In other words, if the movable blade 55 did not extend sufficiently beyond the ends of the fixed blades, the operator would have to expend a great deal more effort and concentration to properly position the blades relative to the leading edge of the workpiece to be cut.

Since the fixed blades may be fixedly attached to the housing 41 and to one another via the pivot pin 57, lateral support for the blades has proven to be unnecessary, thereby eliminating the requirement that the housing extend nearly to the tip of the fixed blades. As a result, the fixed blades can be positioned very closely adjacent a perpendicular lip 87 integral with the workpiece 61, shown extending toward the reader in FIG. 2. It will be realized by those skilled in the art, of course, that the prior art device illustrated in FIG. 1 must be located so that the fixed blade which is closest to such a perpendicular lip must be separated therefrom by a distance equal to the width of the adjacent portion of the housing. Thus, the present invention can be utilized to sever a workpiece at a location much closer to an obstruction or inside corner.

As the workpiece 61 is severed by the tool, the material cut away from it will form a single, continuous strip or chip 89, as seen in FIG. 4. In prior art devices, the relative positions of the cutting blades are such that the chip curls up on top of the movable blade and, eventually, becomes strong enough to prevent further movement of the tool until it is broken away.

In some cases, attempts have been made to bevel the upper surface of the movable blade to cause the cutting of the workpiece to occur at different times from one side of the tool to the other, thereby causing the chip to curl away from the tool. However, this has caused the movable blade to become unsatisfactory for cutting after a very short useful life. In accordance with the present invention, and as clearly seen in FIG. 4, the cutting edge of one of the fixed blades, as illustrated at 65, may be located very slightly below the horizontal plane containing the cutting edge 67 on the opposite fixed blade. As a result, when the blade 55 is oscillated in the cutting direction, the cutting edges 65 and 69 will sever the material 61, causing it to bend very slightly in the manner, for example, of a manual two-bladed shears. Subsequently, the cutting edges 67 and 71 will cooperate to sever the material at the opposite side of the chip. Since the chip has been slightly bent by the first cut, it will tend to curl over to the opposite side of the cutter. It will then be pushed still further toward that side as the second cut occurs.

As a result, the chip will be formed as a single continuous curl which will roll off to one side of the cutter without inhibiting or preventing movement of the cutter across the workpiece.

Consequently, the elimination of the need to bevel the upper surface of the movable cutter blade 55 will allow the cutter blade to enjoy a much longer, useful life since the cutting edges will not become too sharp or too blunt, as would occur if the blade were beveled.

Referring once again to FIG. 3, it is seen that the air motor 43 may be provided with an exhaust outlet 91 which, if desired, may be positioned so as to force the exhausting air over the shearing blades and out through the forward end of the housing. Such a configuration allows the shearing blades and the cam surface to be properly lubricated at predetermined intervals. This can be accomplished, for example, by placing a few drops of oil into the air motor inlet (not shown) and forcing air through the motor, causing the oil to lubricate the motor and the shear blades as it is carried through the motor and out of the housing by the exhaust.

Thus, the applicant has disclosed a cutter which may be very simply constructed and used without requiring the expenditure of excessive effort by the user. Cutters utilizing the present invention may be utilized to sever material in relatively confined areas since the novel construction thereof results in elimination of a large portion of the otherwise obstructive housing. Additionally, such cutters or shears allow very easy cutting along curves without resulting in any damage to the edges of the cut workpiece. These and other advantages of the invention will now be readily apparent to those skilled in the art, as will additional embodiments and modes thereof. Therefore, it is important to note that the invention is not limited to the features described relative to the preferred embodiment but shall be limited only by the matters set forth in the following claims.

Wherefore what is claimed is:

1. A shear comprising
a housing,
at least one blade fixed to said housing so as to extend therefrom and having
a cutting edge thereon located in a workpiece-contacting plane such that said housing is positioned at an acute angle relative to, and removed from any contact with, a workpiece against which said cutting edge is positioned,
a movable blade pivotally mounted on said at least one fixed blade and having
a cutting edge thereon,
means pivotally mounting said movable blade on said at least one fixed blade,
means for driving said movable blade in only one direction about said pivotal mounting means for cooperation of said fixed blade cutting edge and said movable blade cutting edge to sever a workpiece comprising motor means in said housing, cam means in said housing and operatively connected to said motor means to be driven thereby, and cam follower means operatively connected to said movable blade and actuated by said cam means to drive said movable blade about said pivotal mounting means only in a direction in which said cutting edges of said blades close in scissors-like fashion.

2. The shear of claim 1 including means on the end of said movable blade distal from said cam follower means for forcing said cam follower means into contact with said cam means as said housing is pushed across a workpiece to be severed by an operator.

3. A shear comprising a housing, a pair of blades fixed to said housing, a movable blade intermediate said fixed blades and cooperable therewith to sever a workpiece therebetween, motor means mounted in said housing and having cam means operably driven thereby, cam follower means mounted on said movable blade for cooperation with said cam means to drive said movable blade only into a closed position relative to said fixed blades, and means on the leading end of said movable blade for forcing said movable blade into an open position relative to said fixed blades as an operator pushes said housing across a workpiece being severed.

4. The shear of claim 3 wherein said motor means comprises an air driven motor having exhaust means situated within said housing so as to direct air being exhausted from said motor over and past said fixed and movable blades to cool and lubricate them.

5. The shear of claim 3 whrein said pair of fixed blades include beveled surfaces extending away from the said cutting edges thereon so that the cutter may be rotated about the axis of said housing in order to cut along a curved path.

6. The shear of claim 3 wherein said pair of fixed blades include elongated cutting edges in parallel relation-ship to one another and separated in a horizontal plane by a distance which is substantially equal to the width of said movable blade plus a relatively small clearance and separated in a vertical plane by a distance which is sufficient to prevent simultaneous cutting by movement of said movable blade thereagainst at the same longitudinal location along both cutting edges.

7. The shear of claim 3 wherein said movable cutting blade is provided with a lower surface having a longitudinal arcuate configuration and a transverse arcuate configuration throughout that portion of the length thereof which extends below said fixed blades.

8. The shear of claim 3 wherein said motor means comprises a pneumatic motor and includes means for directing the air being exhausted from said pneumatic motor over and past said fixed and movable blades to cool said blades and to lubricate them when oil is injected into the air driving said motor.

9. The shear of claim 8 wherein said movable blade comprises a pair of cutting edges extending along the upper surface thereof and so located thereon as to cooperate with cutting edges on said fixed blades in a progressive shearing relationship when said movable blade is driven by said cam means, said fixed blades each include a cutting edge operatively associated with a cutting edge on said movable blade and means for forcing the chip generated by the progressive shearing action to be curled away to one side of the shear as the shear is moved across a workpiece.

10. The shear of claim 9 wherein said chip forcing means comprises means for locating the cutting edges of said fixed blades in such a relationship that the progressive shearing along one such cutting edge occurs prior to the progressive shearing along the other such cutting edge at any given position along the length of said movable blade.

11. A shear comprising a housing including drive means therein comprising a pneumatic motor, a pair of fixed blades mounted adjacent one end of said housing, a movable blade pivotally mounted between said pair of fixed blades and including means operatively associated with said drive means for oscillatably moving said movable blade relative to said pair of fixed blades and a lower arcuate surface formed on said movable blade to prevent the lower surface thereof rom acting as a secondary cutting edge, and means for directing the air being exhausted from said pneumatic motor over and past said fixed and movable blades to cool said blades and to lubricate them when oil is injected into the air driving said motor.

12. The shear of claim 11 wherein each of said fixed blades includes means for providing a clearance between the lower surface of each blade and a workpiece being sheared sufficient to allow movement of the shear about the longitudinal axis thereof while shearing the workpiece along a curved path.

13. The shear of claim 11 wherein said drive means further includes means driven by said pneumatic motor and operatively associated with said movable blade for driving said movable blade only in a direction to effect a closed relationship with said fixed blades and said movable blade includes means on the leading end thereof for forcing said movable blade into an open relationship with said fixed blades as an operator pushes said housing across a workpiece being severed.

14. The shear of claim 11 wherein said pair of fixed blades include
  beveled surfaces extending away from the said cutting edges thereon so that the cutter may be rotated about an axis of said housing in order to cut along a curved path.

15. The shear of claim 11 wherein
said pair of fixed blades include
  elongated cutting edges in parallel relationship to one another and separated in a horizontal plane by a distance which is substantially equal to the width of said movable blade plus a relatively small clearance and separated in a vertical plane by a distance which is sufficient to prevent simultaneous cutting by movement of said movable blade thereagainst at the same longitudinal location along both cutting edges.

16. The shear of claim 11 wherein
said movable blade comprises
  a pair of cutting edges extending along the upper surface thereof and so located thereon as to cooperate with cutting edges on said fixed blades in a progressive shearing relationship when said movable blade is driven by said cam means,
said fixed blades each include
  a cutting edge operatively associated with a cutting edge on said movable blade and
means for forcing the chip generated by the progressive shearing action to be curled away to one side of the shear as the shear is moved across a workpiece.

17. The shear of claim 16 wherein
said chip forcing means comprises
  means for locating the cutting edges of said fixed blades in such a relationship that the progressive shearing along one such cutting edge occurs prior to the progressive shearing along the other such cutting edge at any given position along the length of said movable blade.

18. A shear comprising
a housing including
  drive means therein comprising
    a pneumatic motor,
a pair of fixed blades mounted adjacent one end of said housing,
a movable blade pivotally mounted between said pair of fixed blades and including
means operatively associated with said drive means for oscillatably moving said movable blade relative to said pair of fixed blades, and
means for directing the air being exhausted from said pneumatic motor over and past said fixed and movable blades to cool said blades and lubricate them when oil is injected into the air driving said motor.

* * * * *